Nov. 26, 1929.  H. A. SELAH  1,736,888

CONDUIT FITTING

Filed Dec. 31, 1926

Howard A. Selah
INVENTOR.

BY
ATTORNEYS.

Patented Nov. 26, 1929

1,736,888

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed December 31, 1926. Serial No. 158,254.

The present invention is directed to a fitting which is designed to couple a flexible conduit, which is ordinarily formed with a corrugated shell, with a conduit fitting arranged to receive a threadless conduit. Features and details of the invention will appear from the specification and claim.

The invention is illustrated in the accompanying drawings as follows:—

Figure 1:
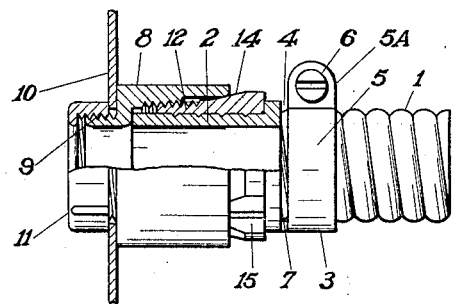

Fig. 1 shows a side elevation, partly in section, of a fitting securing a flexible coupling to a knock-out box.

Figure 2:
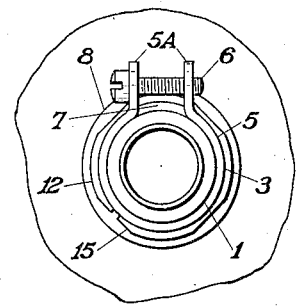

Fig. 2 an end view of the same.

Figure 3:
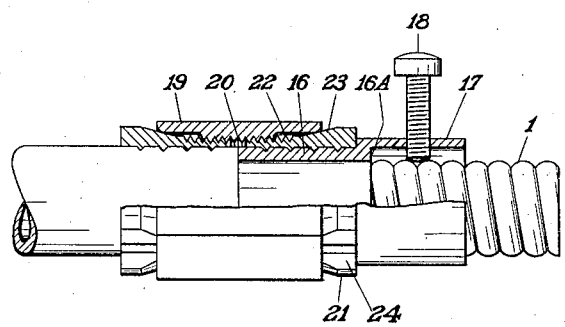

Fig. 3 a side elevation, partly in section, of a fitting securing a flexible coupling to a conduit coupling.

Figure 4:
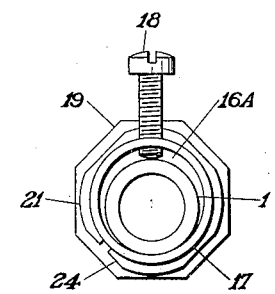

Fig. 4 an end view of the same.

Figure 5:
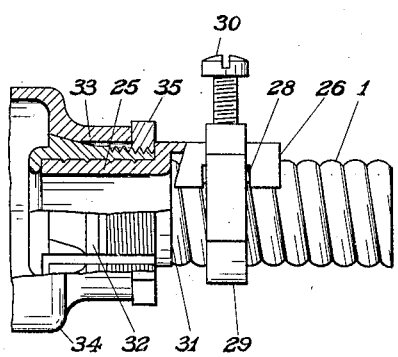

Fig. 5 a side elevation, partly in section, securing a flexible coupling to a conduit box.

Figure 6:
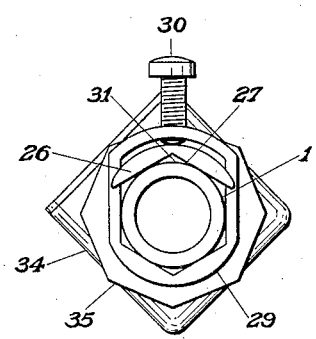

Fig. 6 an end view of the same.

In each of the structures a variation is shown in the fitting to which the flexible conduit is secured and also a variation in the means of securing the flexible conduit to the intermediate conduit fitting. In all the structures, 1 marks the flexible conduit. In the structure shown in Figs. 1 and 2, a threadless sleeve 2 is adapted to be engaged by a threadless conduit fitting. The sleeve is provided with an extension 3 which is separated from the sleeve 2 by a slot 4 extending partly around the sleeve forming contractible ring fingers 5 having projections 5ª at their ends. A clamping screw 6 extends through the projections and is adapted to contract, or clamp the fingers 5 on a flexible conduit 1.

A knock-out box fitting 8 has a threaded extension 9 which extends through the wall 10 of the knock-out box and is secured therein by the flanged nut 11. A contractible sleeve 12 is arranged in the fitting 8, this having a screw-threaded inner end screwing into the fitting, a tapered intermediate portion 14 and a wrench-hold 15 by means of which the contractible sleeve may be screwed into the fitting 8 and contracted into clamping engagement with the sleeve 2.

It will be noted that at the end of the sleeve 2 a shoulder 7 is formed which forms a guard over the end of the flexible conduit so as to prevent the sharp edges of the end of the flexible conduit from injuring the insulation of a conductor as it is drawn into the conduit.

In the construction shown in Fig. 3 a threadless sleeve 16 has an extension 17, a shoulder 16ª being formed between the extension and the sleeve. The extension is in the tubular part and a screw 18 extends radially through the extension and is in position to engage a flexible conduit.

The sleeve 16 is secured in a conduit fitting coupling adapted to engage threadless conduits. It has a sleeve 19 with the interior threads 20 at its center and a contractible sleeve 21 which is screw-threaded at its inner end 22, and has a tapered intermediate end 23 and a wrench-hold 24. The contractible sleeve when screwed into the coupling sleeve 19 is contracted into clamping engagement with the sleeve 16.

In the construction shown in Figs. 5 and 6 a threadless sleeve 25 has an extension 26. The extension has the angled surfaces 27 adapted to center an engaged flexible conduit. The extension has the side slots 28 and a clamping ring 29 extends slidingly through the slots 28 and is adapted to surround an inserted flexible conduit 1 and the extension 26. A screw 30 extends through the ring 29 against the surface 27 of the extension 26 and thus secures the flexible conduit to the extension. A shoulder 31 is formed between the sleeve 25 and the extension against which the end of the flexible conduit rests. The sleeve 25 is connected to a threadless conduit receiving means on a conduit box. It has a tapered contractible sleeve 32 arranged in a tubular extension 33 projecting from a box 34. A nut 35 is screwed on the outer end of the sleeve 32 and draws the sleeve 32 into the extension 33 contracting it into clamping engagement with the threadless sleeve 25.

What I claim as new is:—

In a conduit fitting, the combination of a body having a conduit-receiving opening; a contractible slotted sleeve arranged in the opening adapted to receive a threadless conduit; means contracting the slotted sleeve; a securing sleeve clamped in the slotted sleeve; a clamp extension on the securing sleeve adapted to receive a flexible conduit in alinement with the opening in the securing sleeve; and a clamping means on the extension adapted to clamp a flexible conduit in the extension.

In testimony whereof I have hereunto set my hand.

HOWARD A. SELAH.